United States Patent
Victor et al.

(10) Patent No.: US 7,656,313 B2
(45) Date of Patent: Feb. 2, 2010

(54) METHOD AND SYSTEM FOR SUPPORTING PATH CONTROL

(75) Inventors: Trent Victor, Göteborg (SE); Johan Jarlengrip, Göteborg (SE)

(73) Assignee: Volvo Technology Corp., Gothenburg (SE)

( * ) Notice: Subject to any disclaimer, the term of this patent is extended or adjusted under 35 U.S.C. 154(b) by 122 days.

(21) Appl. No.: 11/421,494

(22) Filed: Jun. 1, 2006

(65) Prior Publication Data

US 2007/0139176 A1     Jun. 21, 2007

Related U.S. Application Data

(63) Continuation of application No. PCT/EP2004/013632, filed on Dec. 1, 2004.

(30) Foreign Application Priority Data

Nov. 30, 2003   (EP)   ..................... PCT/EP03/13479

(51) Int. Cl.
    *G08G 1/123* (2006.01)
(52) U.S. Cl. .................. 340/995.26; 340/979; 340/980
(58) Field of Classification Search ............ 340/995.19, 340/995.1, 995.14, 979, 980, 995.17, 995.26; 701/1, 200
    See application file for complete search history.

(56) References Cited

U.S. PATENT DOCUMENTS

| | | | |
|---|---|---|---|
| 5,289,185 A | 2/1994 | Ramier et al. | |
| 6,977,630 B1 * | 12/2005 | Donath et al. | 345/7 |
| 2001/0028352 A1 | 10/2001 | Naegle et al. | |
| 2002/0032524 A1 | 3/2002 | Schott et al. | |
| 2002/0067366 A1 | 6/2002 | Hijikata et al. | |
| 2002/0101568 A1 | 8/2002 | Eberl et al. | |
| 2002/0167461 A1 | 11/2002 | Bronson | |
| 2003/0045973 A1 * | 3/2003 | Okamoto | 701/1 |
| 2003/0187577 A1 | 10/2003 | McClure et al. | |
| 2004/0066376 A1 | 4/2004 | Donath et al. | |

FOREIGN PATENT DOCUMENTS

| | | |
|---|---|---|
| EP | 1235052 A | 8/2002 |
| JP | 7257228 | 10/1995 |
| JP | 07280592 A1 | 10/1995 |
| JP | 10176928 | 6/1998 |
| JP | 2000211452 | 8/2000 |
| JP | 2003054334 A | 2/2003 |
| JP | 2003 341383 A | 12/2003 |
| WO | 2005054786 A1 | 6/2005 |
| WO | 2005055189 A1 | 6/2005 |

OTHER PUBLICATIONS

International Search Report from corresponding International Application PCT/EP2004/013632.

(Continued)

*Primary Examiner*—Travis R Hunnings
(74) *Attorney, Agent, or Firm*—WRB-IP LLP

(57) ABSTRACT

Method and system for supporting path control are disclosed for supporting path control especially of a vehicle on a road or in an off-road environment, or of a ship or an airplane. The supporting of path control is especially provided by conducting at least one of the following steps (a) and (b): (a) estimating an actual future path of the vehicle on the basis of vehicle movement data and at least one of optically, acoustically, and tactilely indicating the estimated actual future path to the driver, (b) detecting the actual present path of the vehicle, estimating a present deviation of the detected actual present path from a desired present path and at least one of optically, acoustically, and tactilely indicating the estimated present deviation to the driver.

53 Claims, 18 Drawing Sheets

OTHER PUBLICATIONS

International Preliminary Examination Report from corresponding International Application PCT/EP2004/013632.

International Search Report for related International Application PCT/EP2003/013479 (W02005055189)(with International Application).

International Search Report for related International Application PCT/EP2004/013631 (W02005054786)(with International Application).

Translation of Official Action from corresponding Japanese Application 2006-541882.

* cited by examiner

A

B

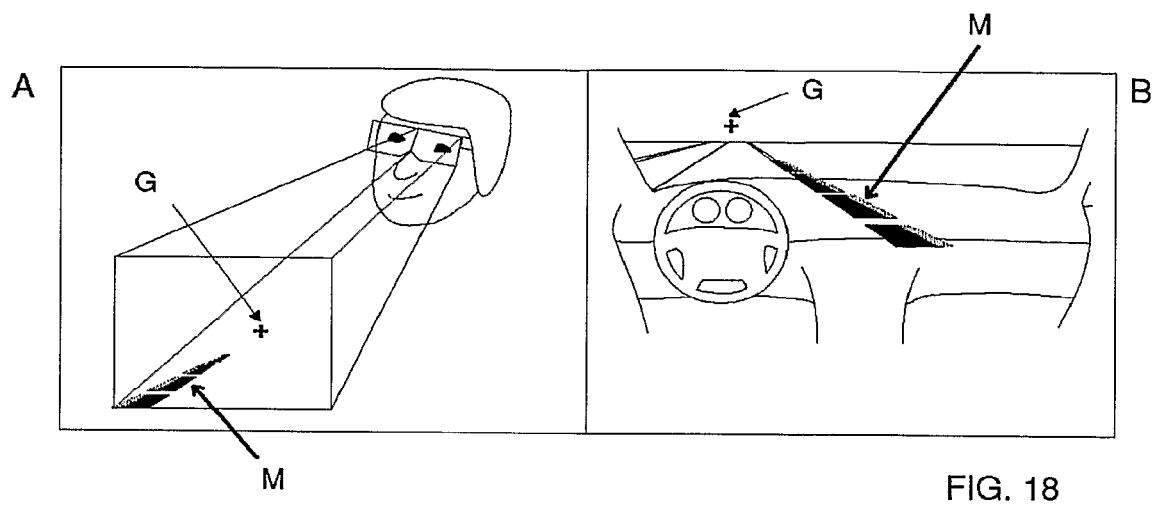
FIG. 18
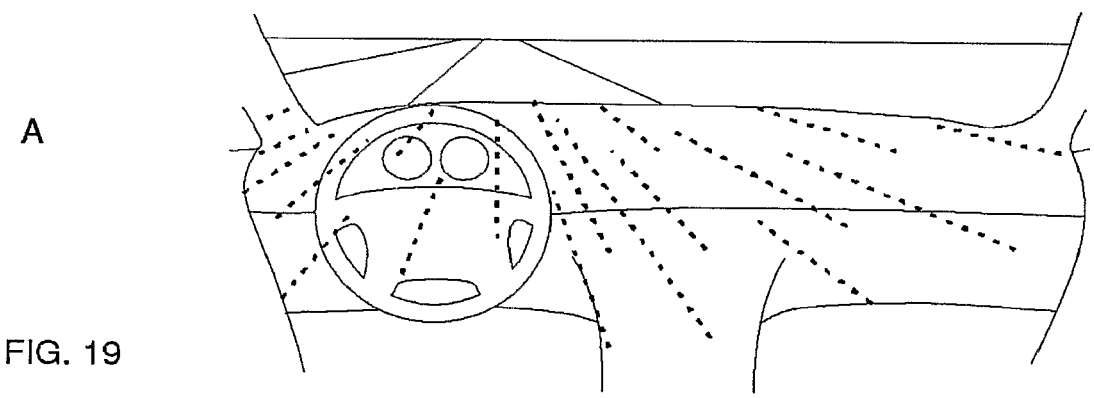
FIG. 19
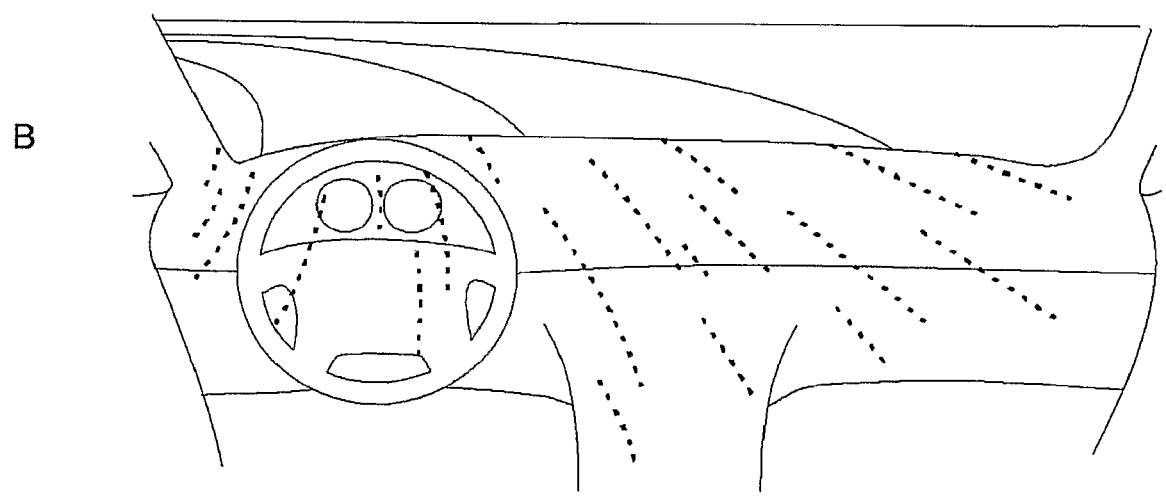

METHOD AND SYSTEM FOR SUPPORTING PATH CONTROL

The present application is a continuation of International Application PCT/EP2004/013632, filed Dec. 1, 2004, which claims priority to PCT/EP03/13479, filed Dec. 1, 2003, both of which are incorporated by reference.

The invention relates to a method and a system for supporting path control especially of a vehicle on a road or in an off-road environment, or of a ship or an airplane.

It is generally known that for safely driving a vehicle the driver has to look predominantly onto the road for observing the traffic and avoiding accidents. However, especially drivers in current vehicles are often required to look away from the road and into the interior of the vehicle. For example, the driver frequently needs to directly fixate (look straight at) the speedometer, the radio or navigation displays and he must be able to read and understand the information presented there and to operate these and other devices, additionally to driving the vehicle and monitoring the traffic.

Any glances away from the road for example into the interior of the vehicle can potentially cause an unsafe driving situation because the driver's ability to detect changes in the on-road environment is reduced. Off-road glances lead to undesirable safety consequences such as increased variability of lane-keeping performance, lane exceedencies, increased brake reaction times, missed events and more.

It is desirable to provide a method and system by which the above mentioned risks can be further reduced and the safety especially of driving a vehicle can be further increased.

It is desirable to provide a method and system for supporting path control especially of a vehicle on a road or in an off-road environment.

In accordance with an aspect of the present invention, a method for supporting path control of a vehicle comprises estimating an actual future path of the vehicle on the basis of vehicle movement data and at least one of optically, acoustically, and tactilely indicating the estimated actual future path to the driver, and determining at least one of a head and eye position of the driver and presenting the estimated actual future path to the driver in an optical relation to an actual driving environment.

In accordance with an aspect of the present invention, a system for supporting path control of a vehicle comprises an arrangement for estimating an actual future path of the vehicle based on vehicle movement data and at least one of optically, acoustically, and tactilely indicating the estimated actual future path to the driver, a device for determining at least one of a head and eye position of a driver, a display device, and a control device for controlling the display device so that the estimated actual future path can be presented in an optical relation to an actual driving environment.

In accordance with an aspect of the present invention, a method for supporting path control of a vehicle comprises detecting an actual present path of the vehicle, estimating a present deviation of the detected actual present path from a desired present path and at least one of optically, acoustically, and tactilely indicating the estimated present deviation to the driver, and determining at least one of a head and eye position of the driver and presenting the estimated present deviation to the driver in an optical relation to an actual driving environment.

In accordance with an aspect of the present invention, a system for supporting path control of a vehicle comprises an arrangement for estimating an actual future path of the vehicle based on vehicle movement data for detecting the actual present path of the vehicle, estimating a present deviation of the detected actual present path from a desired present path and at least one of optically, acoustically, and tactilely indicating the estimated actual future path to the driver, a device for determining at least one of a head and eye position of a driver, a display device, and a control device for controlling the display device so that the estimated present deviation can be presented in an optical relation to an actual driving environment.

A considerable advantage of aspects of the invention is that the method can be used for off-road applications as well if instead of a road, a course is predetermined by e.g. a navigation system.

BRIEF DESCRIPTION OF THE DRAWINGS

Further details, features and advantages of the invention are disclosed in the following description of preferred and exemplary embodiments of the invention with reference to the drawings in which shows:

FIG. 18 an exemplary representation of an eyeglass mounted display for controlling the present path of a vehicle; and FIG. 19 a schematic representation of a flow of optical signals for controlling the present path of a vehicle.

DETAILED DESCRIPTION

Figure 1:
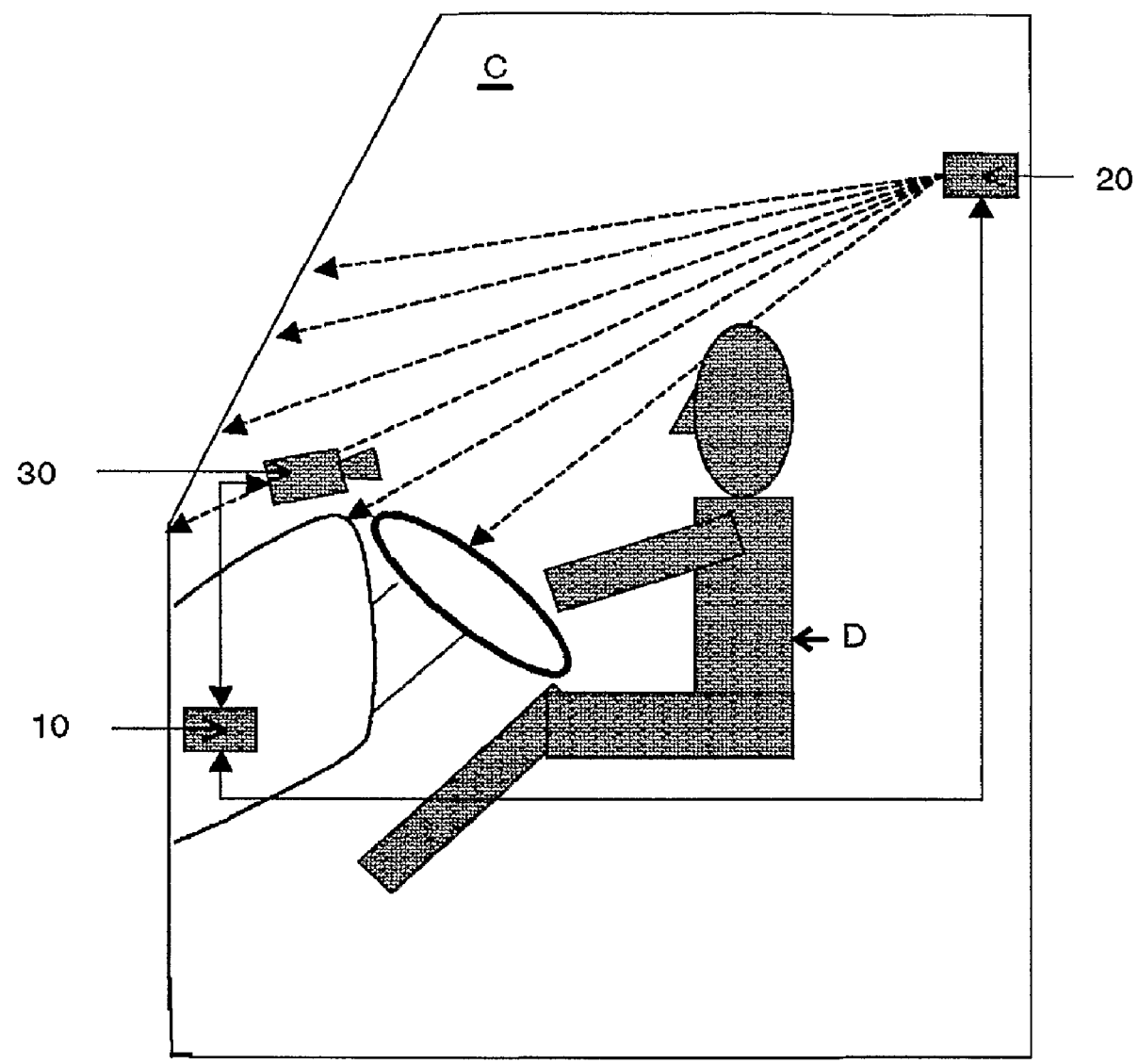
FIG. 1 a schematic view of a first embodiment of a system according to the invention.

FIG. 1 shows a side view into the cabin C of a vehicle with a driver D who is driving the vehicle and shows a first embodiment of a system for supporting path control according to the invention.

A main component of this system is a control device 10 which is connected with a display device 20 e.g. in the form of a laser projector, and a visual behaviour sensor 30 for detecting head and/or eye position of the driver D.

The control device 10 is provided for receiving head and/or eye position data from the visual behaviour sensor 30, and for receiving vehicle movement data, generated by at least one sensor (not shown) for detecting the velocity and/or a yaw rate and/or a wheel angle etc. of the vehicle. The main components especially of the control device 10 shall be described with reference to FIGS. 4 and 10.

The control device is provided for processing these data and for controlling the display device 20 for displaying an estimated actual future path of the vehicle and/or an estimated present deviation of the vehicle from a desired present path on the basis of a detected actual present path to the driver D. The laser projector 20 is provided and installed to project such an image for example onto a certain location of the windscreen of the vehicle.

The term "display device" is used in this disclosure to refer to any source of visual information presentation to the driver. Examples of displays include conventional computer displays, e.g. Liquid Crystal Displays (LCD) or similar, used to present GPS-based navigation and map information or other electronic devices, displays in the instrument panel, head-up displays, light emitting diodes (LEDs), and other projection displays. Helmet-mounted-,visor-mounted-, eyeglass-mounted displays can also be used.

An example of a projection display is a commercially available diode laser (see e.g. www.lasershow.se) which is capable of producing color picture stimuli. A picture stimulus is made up of a single laser beam which is moved around so quickly that the impression of an image is generated. The beam is controlled by two small electromagnetic motors (x-, and y-axis) with a small mirror on the motor axis. The use of a number of different lasers is advantageous, including a red and/or blue and/or green laser. However, in many applications it is sufficient to use a simple, inexpensive laser, such as those commonly used for as pointing devices for presentations in an auditorium; an automotive grade laser could be used as well.

Finally, this system comprises a visual behavior sensor 30 for eyetracking which is for example a camera mounted on the dashboard or another sensor which can be head mounted for detecting the gaze direction or gaze position of the driver D and which is connected to the control device 10.

Figure 2:
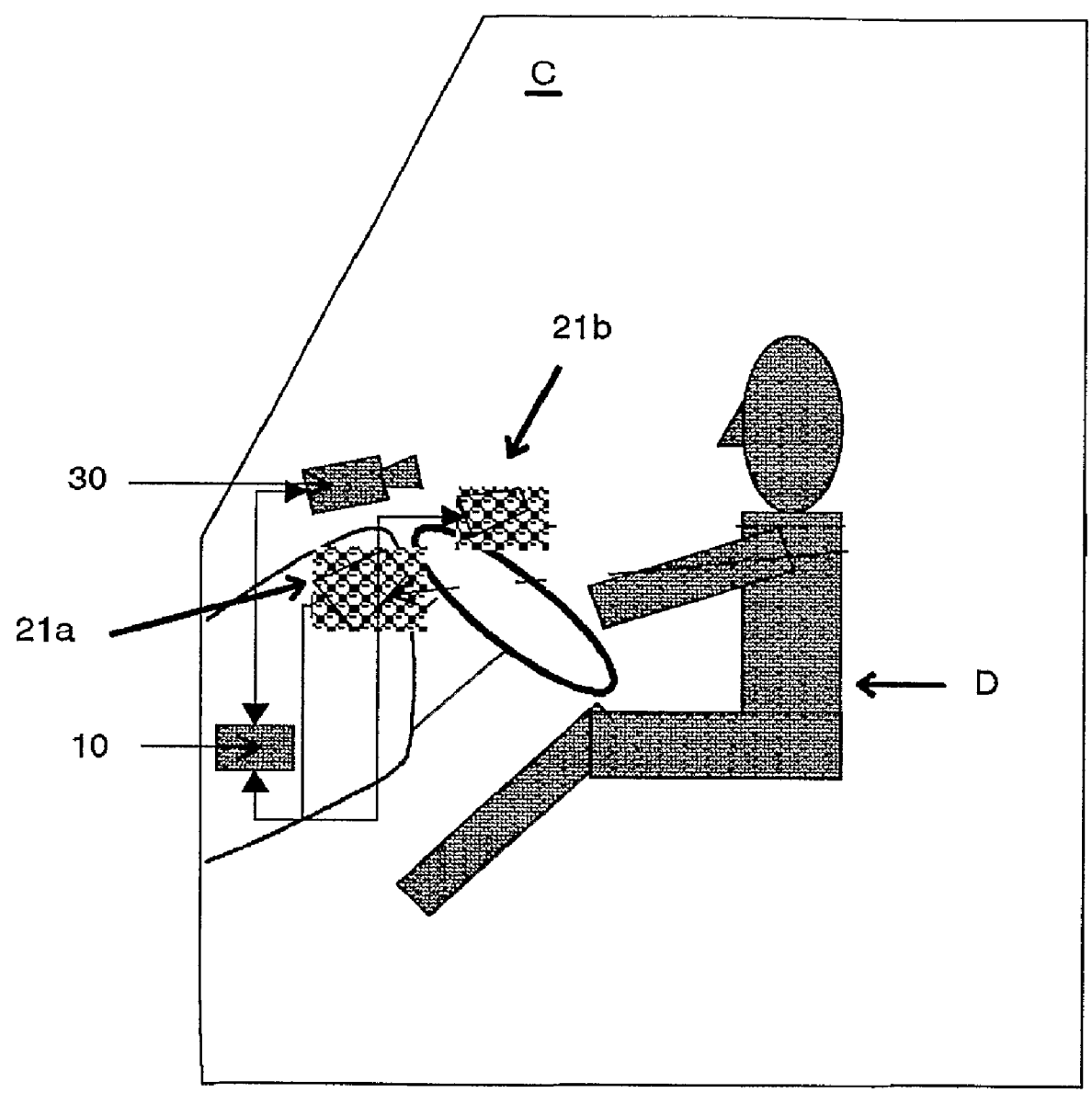
FIG. 2 a schematic view of a second embodiment of a system according to the invention.

FIG. 2 again shows a side view into the cabin C of a vehicle with a driver D who is driving the vehicle. FIG. 2 shows a second embodiment of a system for supporting path control according to the invention in which instead of the laser projector two arrays of light emitting diodes 21a, 21b are provided which are explained in more details with reference to FIGS. 12 and 13 below.

Figure 3:
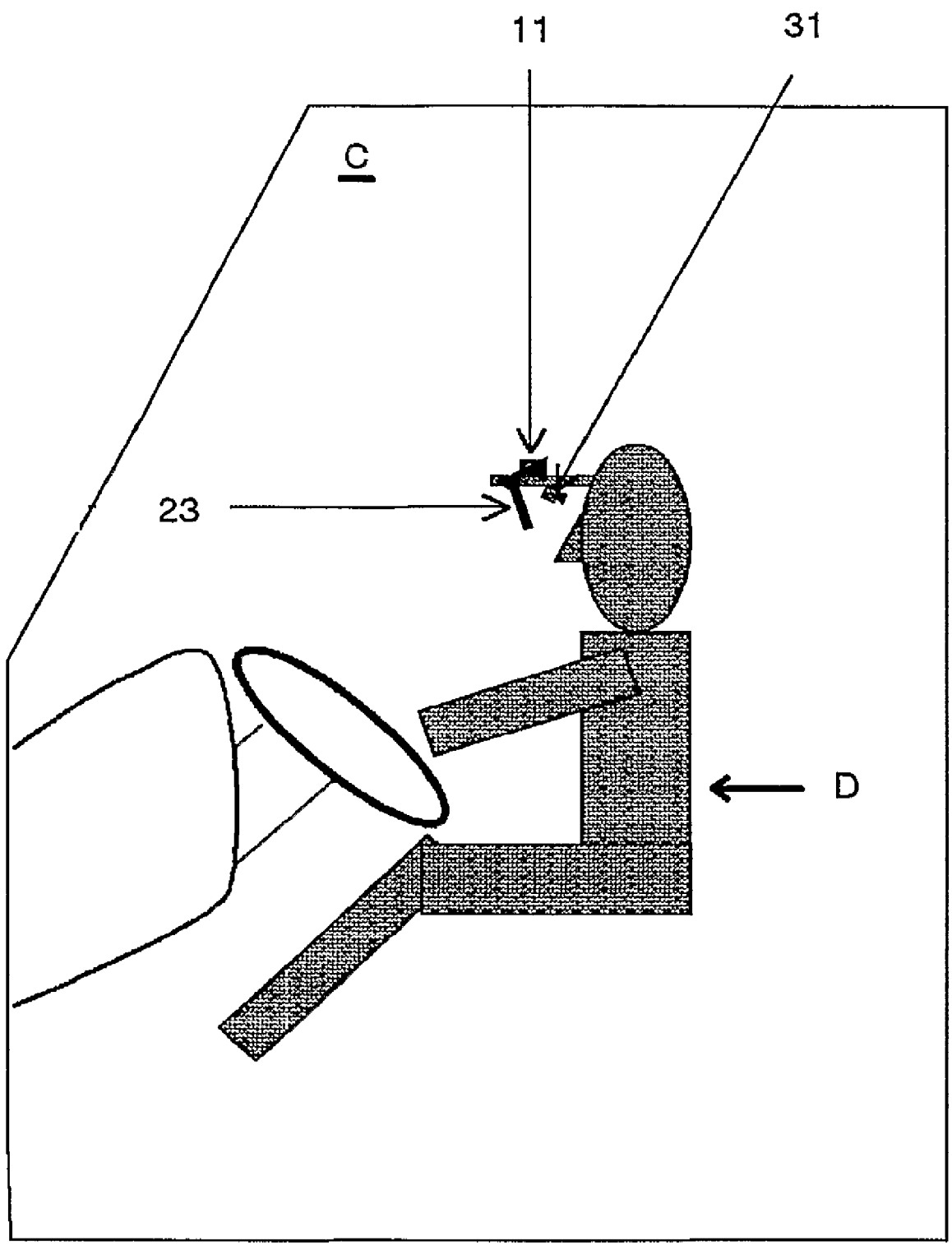
FIG. 3 a schematic view of a third embodiment of a system according to the invention.

FIG. 3 shows a third embodiment of the invention for supporting path control in which the image is presented to the driver D via a head mounted visor 23 which as well comprises the visual behavior sensor 31 and the control unit 11.

Figure 4:
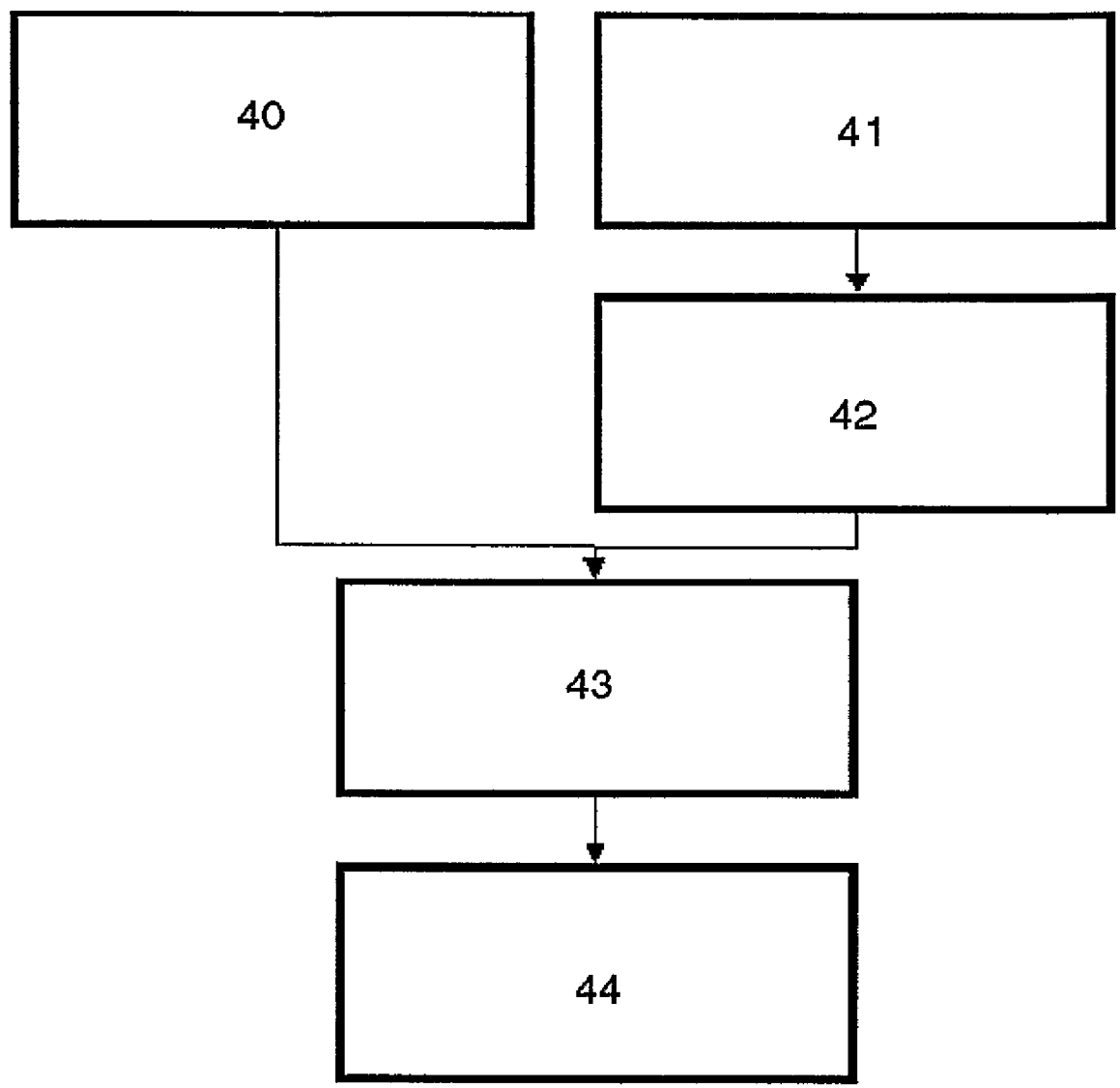
FIG. 4 a block diagram of components of a first arrangement of the system for presenting the future path of a vehicle according to the invention.

FIG. 4 shows a book diagram of components of a first arrangement for presenting the future path of the vehicle according to the invention. A first component 40 is provided for detecting head and/or eye position data to the driver. A second component 41 is provided for detecting vehicle data like for example a yaw rate and/or a wheel angel and/or a velocity of the vehicle. A third component 42 is provided for calculating a path prediction on the basis of the detected vehicle data. On the basis of the head position and/or the eye position data of the driver, and the calculated path prediction, a fourth component 43 is provided for calculation of display parameters to achieve and obtain a display presentation 44 as disclosed in one of FIGS. 6 to 10.

Figure 5:
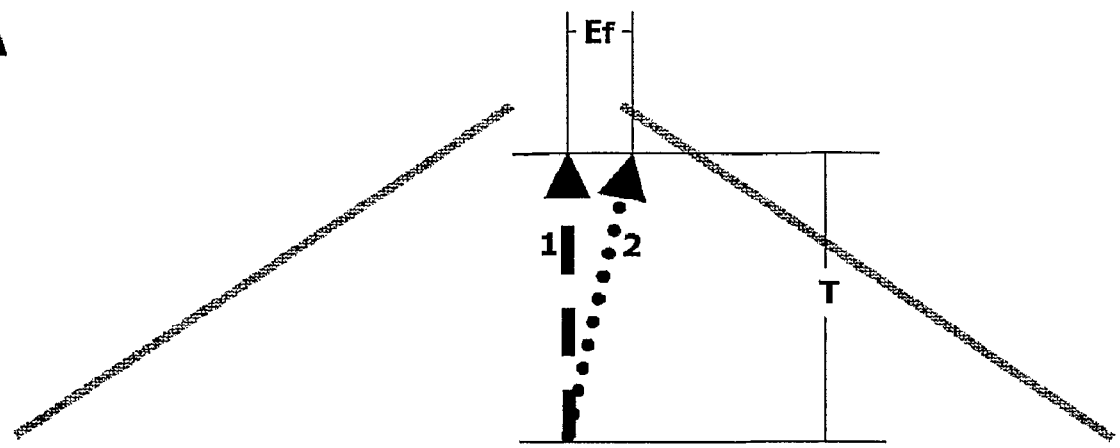
FIG. 5 a schematic diagram of a desired future path in comparison to an actual future path.
Figure 5:
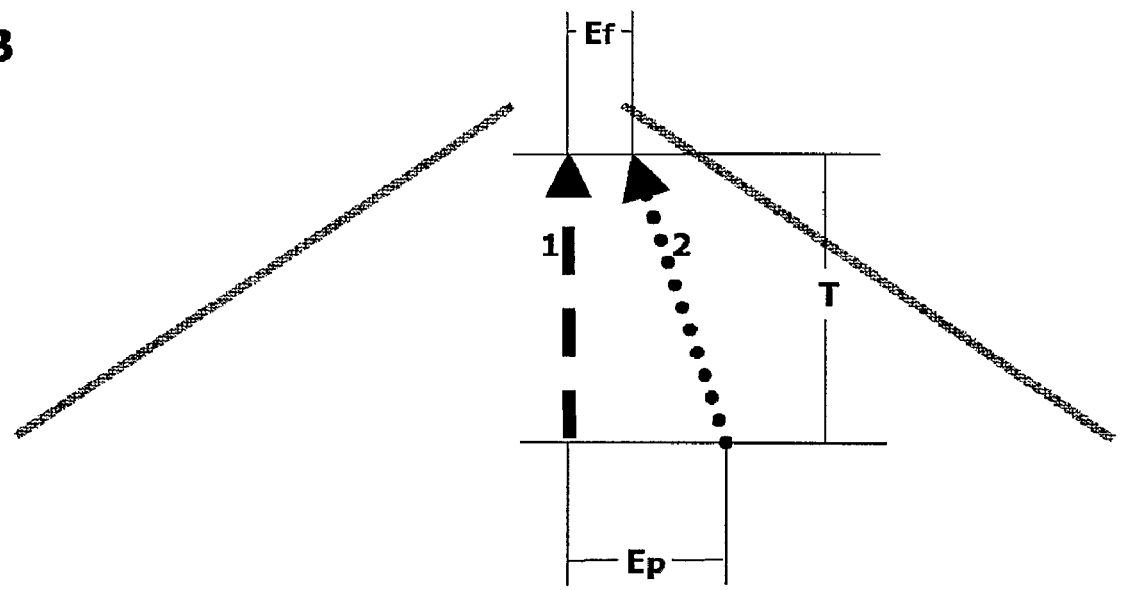
Figure 6:
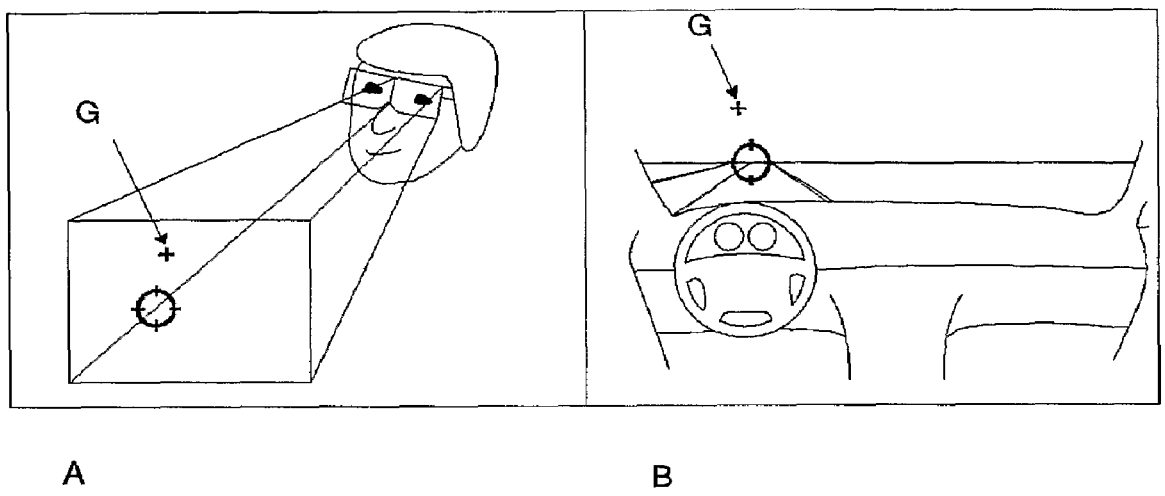
FIG. 6 an exemplary representation of a future path trajectory display integrated into a head mounted display.

FIGS. 5A, B show a schematic diagram of a desired future path in comparison to an actual future path. In these representations the arrows 1 indicate the desired future path and the arrows 2 indicate the actual future path. Ef is the error between the desired and the future path at the preview distance T. Ep is the error between the current path position and a desired path position. The solid line represent the border of the path.

FIG. 5A shows an actual future path 2 with correct current (present) path position and incorrect future path trajectory at the far path point. FIG. 5B shows an actual future path 2 with both an incorrect current (present) path position and in incorrect future path trajectory at the far path point.

Controlling the future path trajectory involves comparing where the vehicle is going (arrow 2 in FIG. 5A) with where it should be going (arrow 1). To control the future path trajectory, the driver makes steering corrections based on the discrepancy (Ef) between the actual future path of the vehicle (arrow 2) and the desired future path (arrow 1) at a preview distance T. Drivers evaluate future path error Ef by fixating a point on the future path about 4 degrees down from true horizon and at a preview distance about one second into the future, called the far-path point. Eye-fixations become increasingly concentrated to this future path region as demands on the driver increase. Gaze concentration on the future path intensifies with traffic environment workload, secondary task workload, and driver state factors such as fatigue and impairment. Drivers prioritize the visual guidance of their path-control task over recognition and planning tasks.

Given the significance of the far-path point for detecting future-path error, and the added priority drivers place on it when driving gets demanding, it follows that a system that assists the driver in detecting future-path error would be advantageous. If future-path error can be made more easily recognizable, then steering corrections become improved, path control is improved, and the driver can place more priority on recognition and planning tasks because she is freer to move her eyes around to other objects and areas of vision during highly demanding situations.

FIGS. 6A, B show an example of a future path trajectory display integrated into a head mounted display. FIG. 6A shows a presentation integrated into the eyeglasses of the head mounted display wherein FIG. 6B shows the driver's view of the same information. The gaze point G of the driver is indicated by a cross and the aiming of the vehicle is indicated by a circle.

Figure 7:
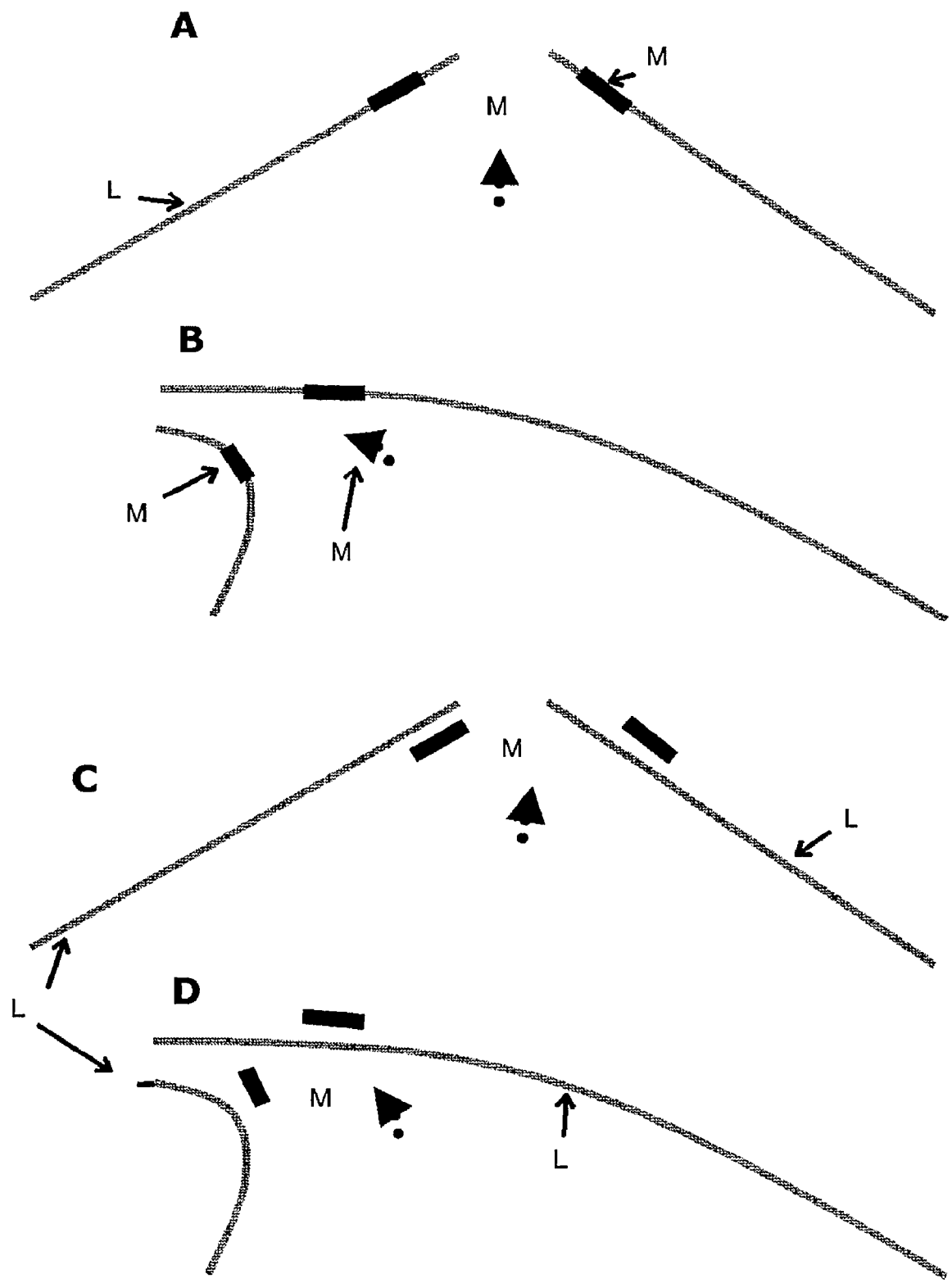
FIG. 7 a first embodiment of a future path trajectory display.

FIG. 7 shows a first embodiment of a future path trajectory display as seen by the driver when looking at the road through the windscreen. The indicated lines L are the border lines of a road wherein the markings M are displayed to the driver.

FIG. 7A shows an on-path situation when driving on a straight road wherein FIG. 7B shows an on-path situation when driving into a left turn. FIG. 7C shows an off-paths situation when driving along a straight road wherein FIG. 7D shows an off-path situation when driving into a left turn.

Figure 8:
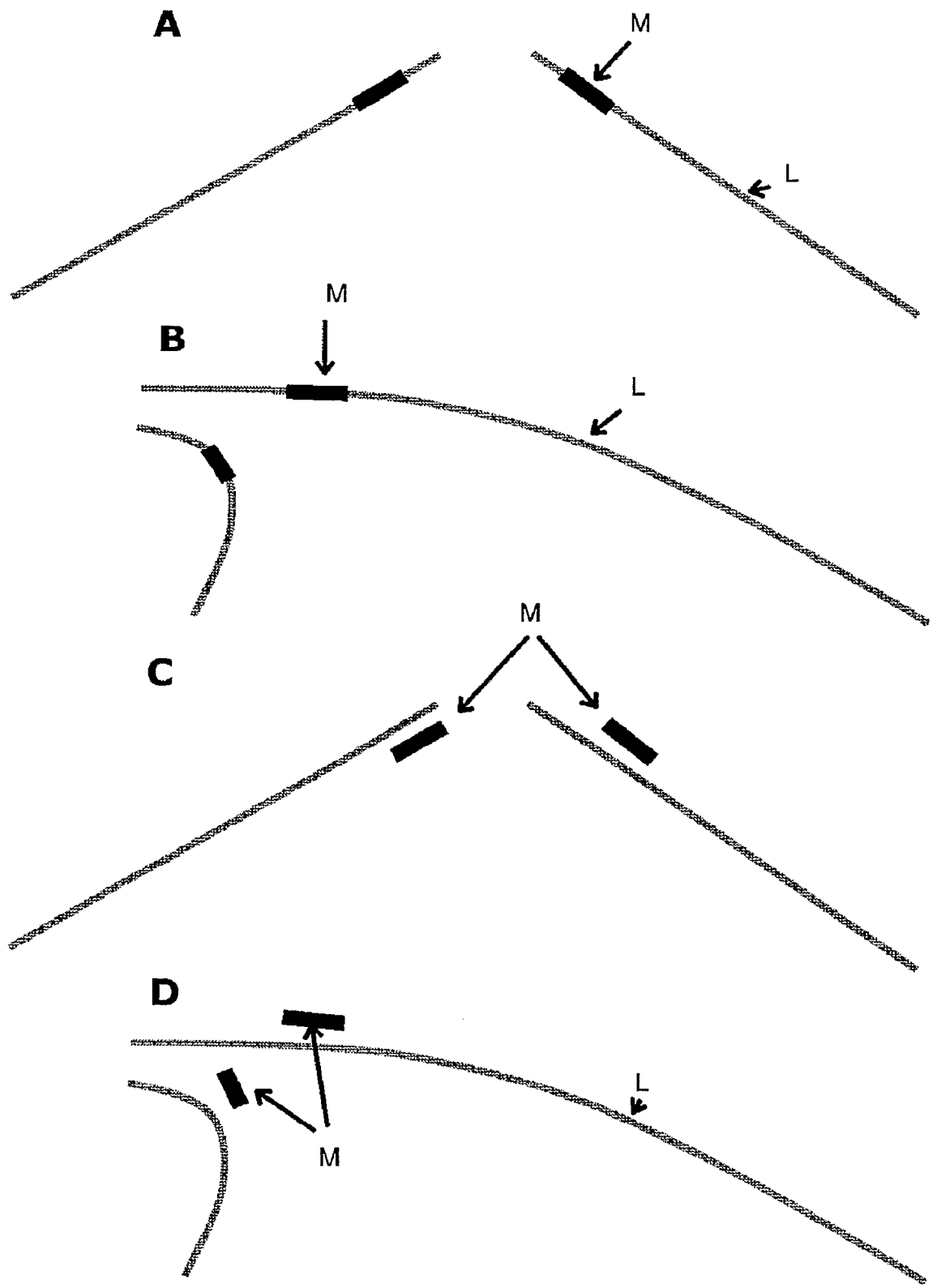
FIG. 8 a second embodiment of a future path trajectory display.
Figure 9:
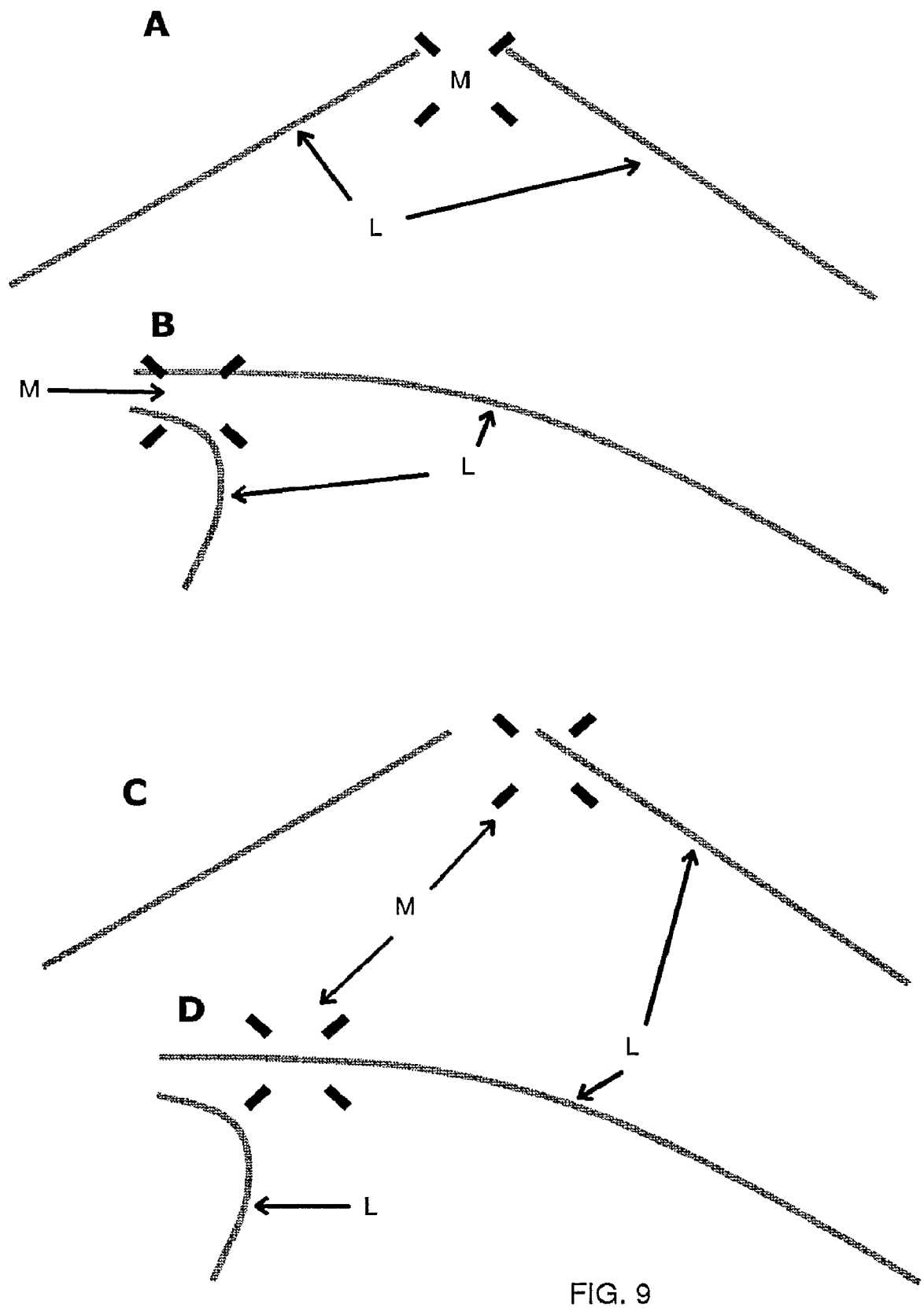
FIG. 9 a third embodiment of a future path trajectory display.

FIGS. 8 and 9 show a second and a third embodiment, respectively, of a future path trajectory display wherein again the border lines of the road L and the markings M which are presented to the driver are indicated. These Figures show the same on-path and off-path driving situations on a straight road and in a left turn, respectively, as in FIG. 7 however, they are provided for clarifying that different kinds of markings M can be used which are displayed to the driver.

This first arrangement which has been described with reference to FIGS. 4 to 9 is provided for supporting future path control and especially for providing a feedback to support future-path trajectory assessment as follows:

Displays are known which present the future paths of moving objects such as vehicles, aircraft (U.S. Pat. No. 5,289,185A), ships, robots exist (see EP 01065642A2, Endsley et al, 1999). These displays are variously called Quickening displays, Predictive displays, and Preview displays (see Lion, 1993; Mathan et al. 1996; and http://wwwtunnel-in-the-sky.tudelft.nl/pred.html). Quickening a display means adding an indicator which extrapolates the current state of the moving object. The most notable use of a quickened display is in the flight director of many modern commercial airlines, which tells the pilot where to head to stay on the flight plan. However, current future path displays do not relate the presentation to eye or head position or present only the future path at the far path point.

To support the control of the future path trajectory, the system according to the invention provides predictive information to the driver about the vehicle's actual future path so that the driver can directly see the difference between where the vehicle is heading and where the driver actually wants to go, i.e. to make the error term more visible.

FIGS. 6 to 9 show examples how the actual future path can be presented to the driver. These displays ideally require the system to have information of 1) head position and/or eye position (from, for example, U.S. Pat. No. 5,802,479, U.S. Pat. No. 5,844,486, or Seeing Machines FaceLAB at www.seeingmachines.com), 2) a path prediction estimate (calculated, for example, as in U.S. Pat. No. 6,466,863, U.S. Pat. No. 6,542,111, or U.S. Pat. No. 6,675,094), and 3) the means with which to present information. See FIGS. 4 and 10. Various set-ups can be used, such as those presented in FIGS. 1 to 3.

The fourth component 43 in FIG. 4 represents the calculations of display parameters that are needed to present the future path indication as shown in FIGS. 6 to 9. The actual future path of the vehicle is calculated with a path prediction algorithm (third component 42), and a future path indication, as shown in FIGS. 6 to 9, is displayed. Knowledge of head and/or eye position data and position of the display surfaces enable geometric calculations to be made wherein the displayed information is correctly positioned relative to the outer environment as is shown in FIGS. 6 to 9. The information presentation can be set the distance of the future path point (distance T in FIG. 5) if, for example, speed information from vehicle sensors is available.

The second arrangement which is provided for supporting a present path control shall now be described with respect to FIGS. 10 to 18 and in a further developed embodiment with respect to FIG. 19.

Figure 10:
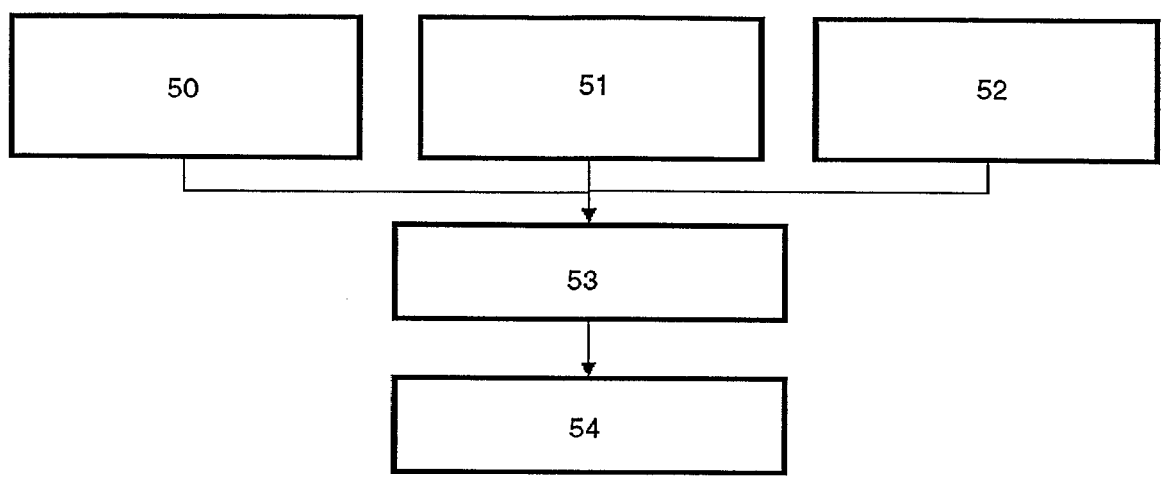
FIG. 10 a block diagram of components of a second arrangement of the system for presenting the present path of a vehicle according to the invention.

FIG. 10 shows a block diagram of components of the second arrangement of the system for presenting the present path of a vehicle according to the invention. A first component 50 is again provided for detecting head position data and/or eye position data of the driver. A second component 51 is a lanetracker for sensing lanetracking data, and a third component 52 is provided for detecting the speed of the vehicle. On the basis of the output signals of these three components 50, 51, 52 geometric calculations are performed by means of a fourth component 53 to achieve and obtain a display presentation 54 as shown in FIGS. 11 to 17.

Figure 11:
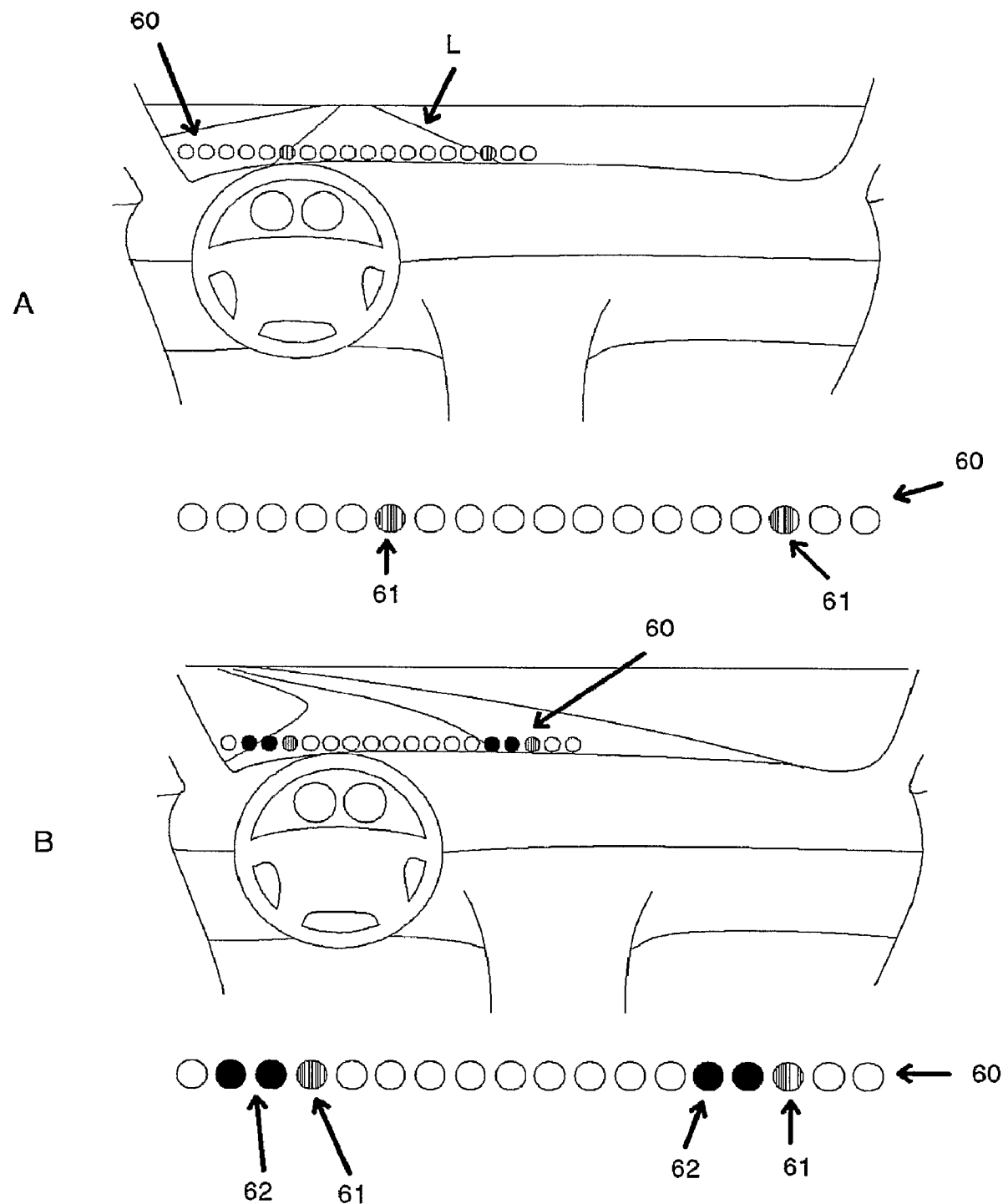
FIG. 11 a first embodiment of a display for controlling the present path of a vehicle.

FIG. 11 shows a first embodiment of a display in the form of a line of light emitting elements 60 which are activated and/or deactivated so that a lane-keeping display is achieved.

According to FIG. 11A the vehicle is centered in the lane. According to FIG. 11B the vehicle is on its way out of its lane towards the right. The grey striped LED' 61 (e.g. green LEDs) indicate the goal state and the black LEDs 62 (e.g. red LEDs) represent the amount of error from the goal state. The goal state LED's 61 line up with the lane markings L in FIG. 11A and the last in the line of error LED's 62 also match up with lane markings L in FIG. 11B.

Figure 12:
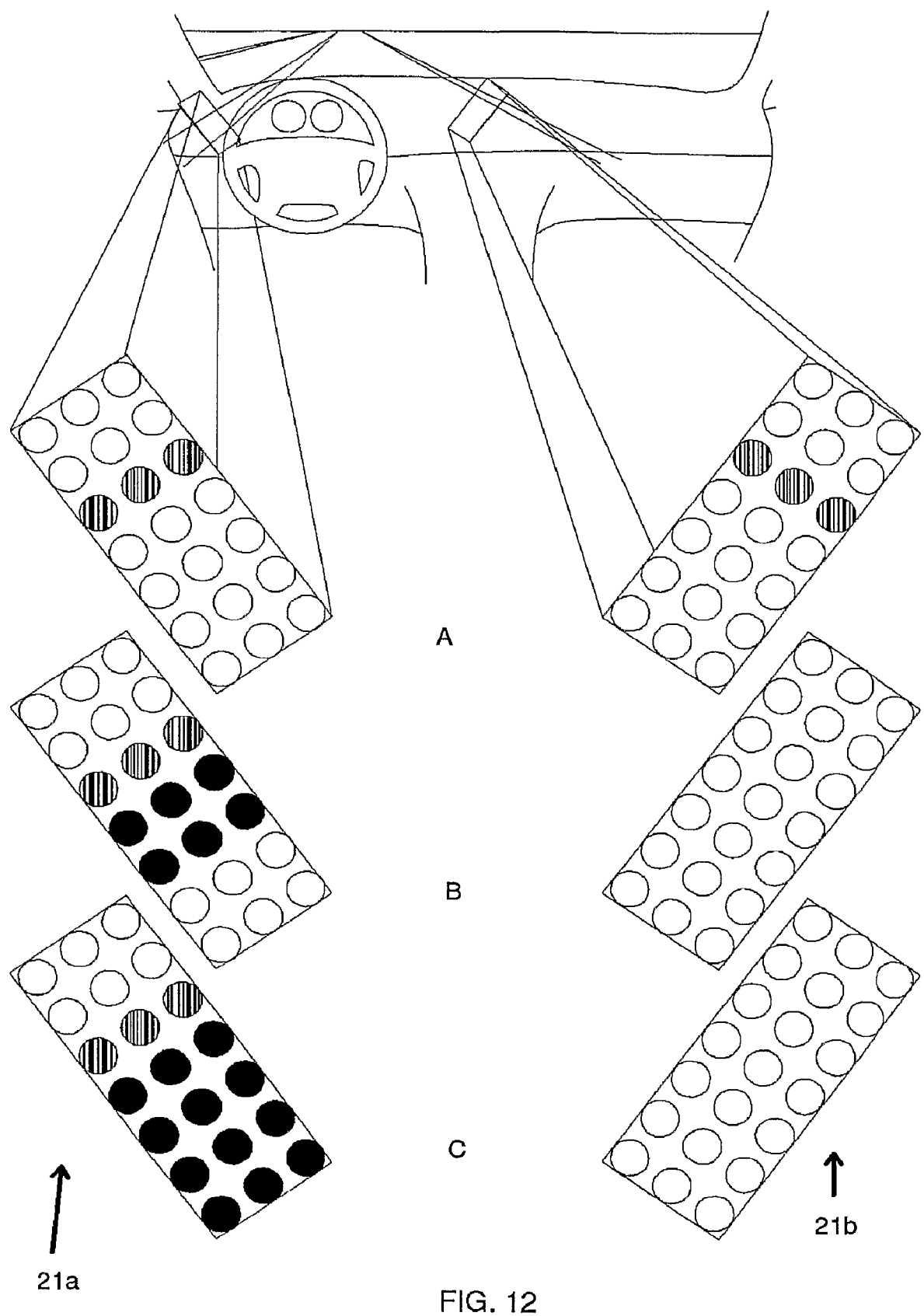
FIG. 12, 13 a second embodiment of a display for controlling the present path of a vehicle.
Figure 13:
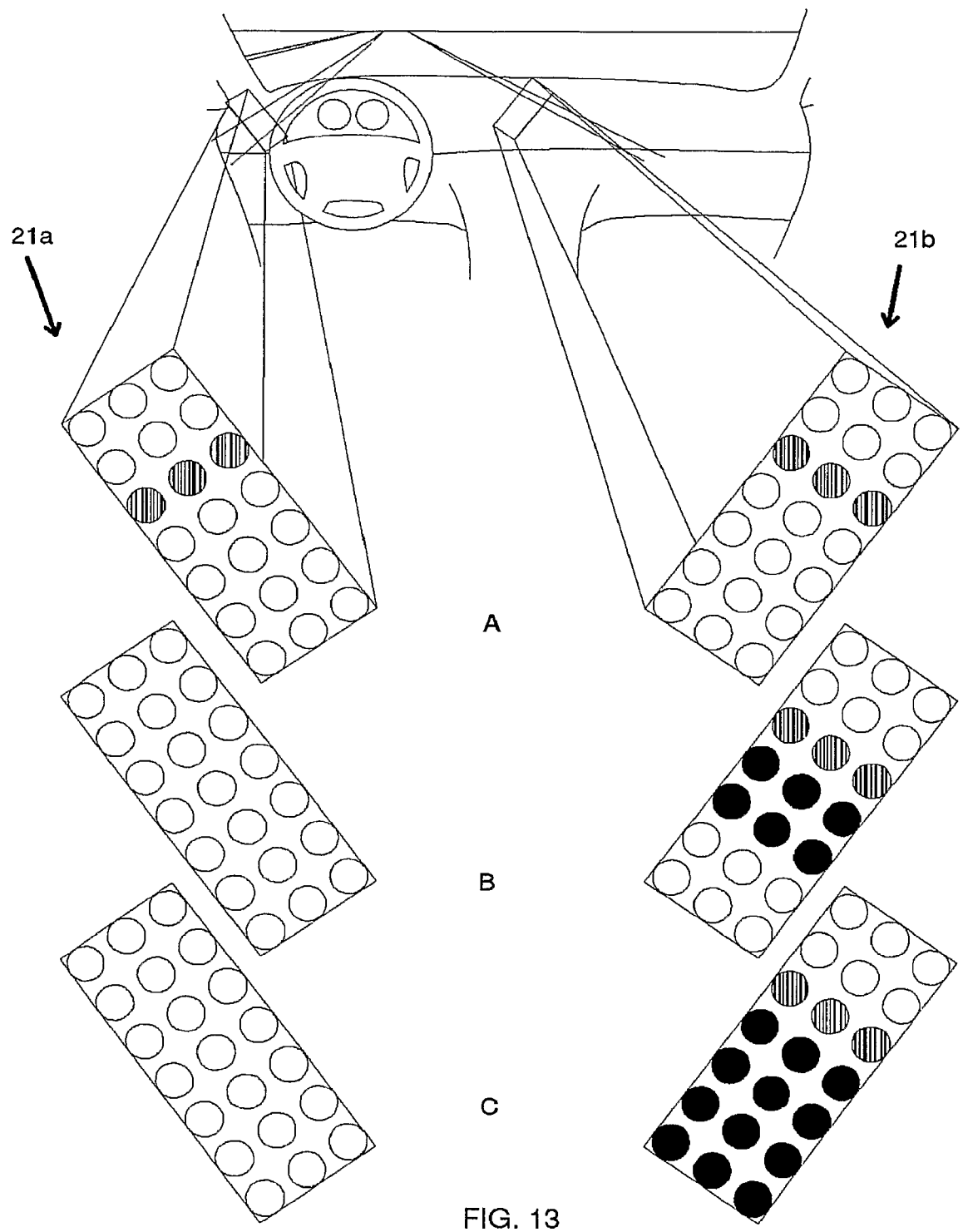

FIGS. 12 and 13 show a second embodiment of a display in the form of a pair of matrices 21a, 21b of LED elements (see FIG. 2) which are installed at the dashboard of the vehicle.

The matrix pair A shows how the display looks when the car is centered in lane. The pairs B an C show steps with increasing number of black LEDs (e.g. red LEDs) as the vehicle progresses out of the lane towards the left. The grey markings (e.g. green LEDs) represent goal state.

In FIG. 13 the matrix pair A again shows how the display looks when the car is centered in lane. The pairs B and C show steps with increasing number of black LEDs (e.g. red LEDs) as the vehicle progresses out of the lane towards the right. The grey markings (e.g. green LEDs) represent goal state.

Figure 14:
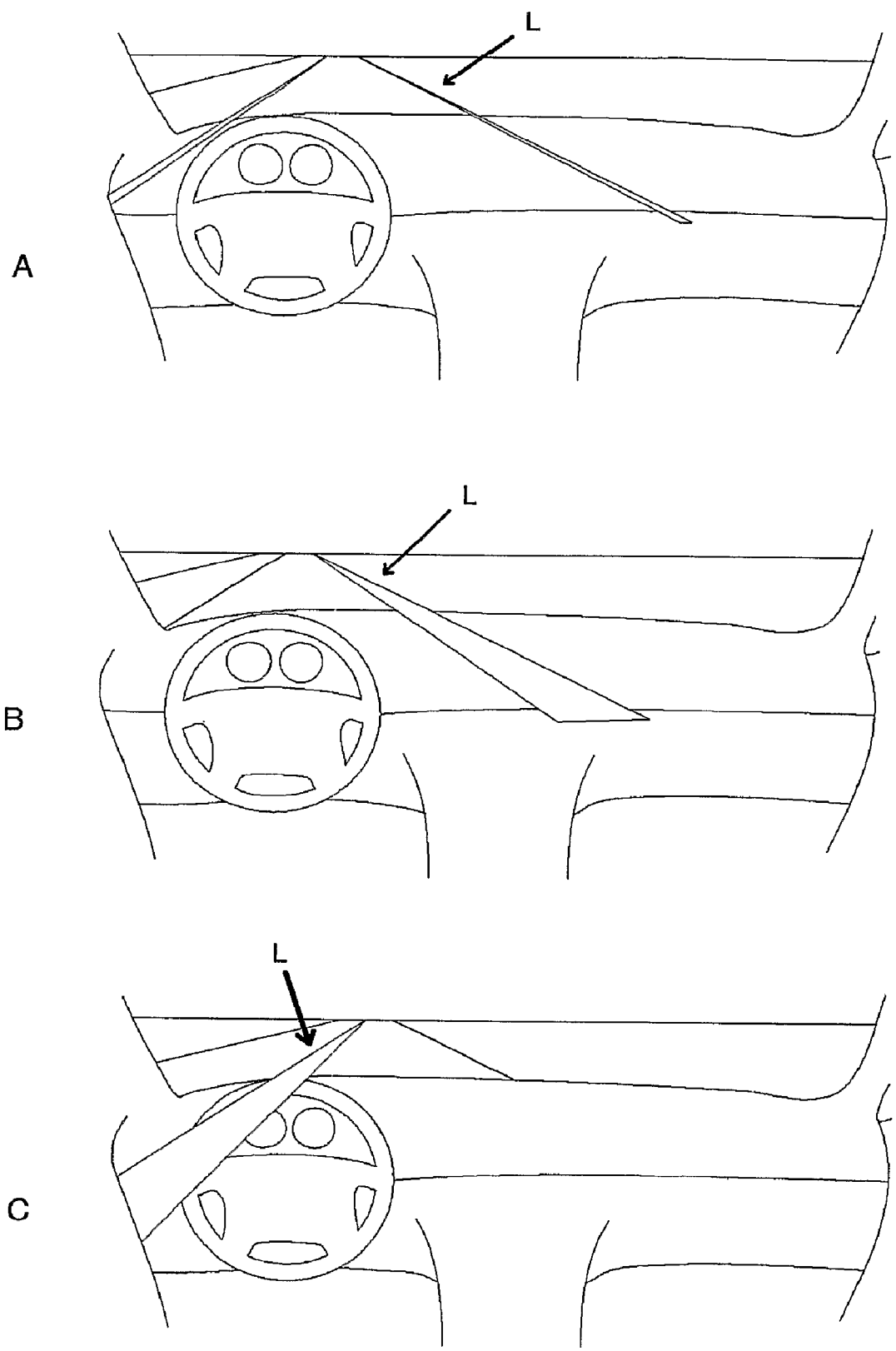
FIG. 14 a third embodiment of a display for controlling the present path of a vehicle.

FIG. 14 shows a third embodiment of a display for imaging of lane-keeping information with solid markings. FIG. 14A shows markings that are presented when the vehicle is centered in lane. As the vehicle starts moving out of lane towards the right, in FIG. 14B, the markings become larger to the right and disappear to the left. The vehicle is moving out of the lane to the left in FIG. 14C. It is noted that the presentation is extended to match the lane markings L on the road by projecting information on the windshield as well as on the interior surfaces. Alternatively these same markings can be presented on a head mounted display device. Another alternative is to present the markings only when the vehicle starts moving out of the lane, in which case there would be no markings in FIG. 14A.

Figure 15:
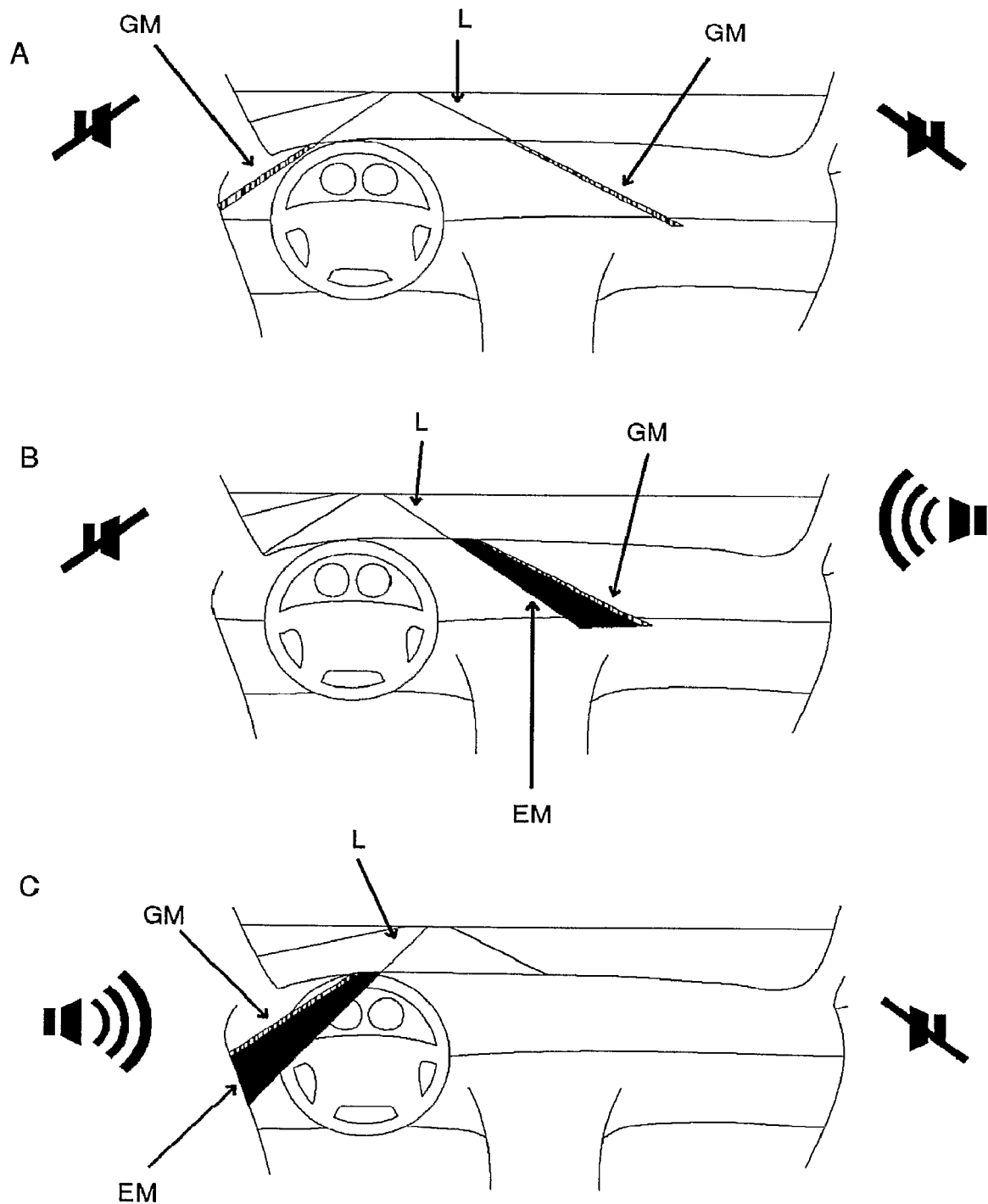
FIG. 15 a fourth embodiment of a display for controlling the present path of a vehicle.

FIG. 15 shows a fourth embodiment of a display for imaging of lane-keeping information accompanied by sound and with a goal state. FIG. 15A shows goal-state markings GM that are presented when the vehicle is centered in lane. As the vehicle starts moving out of lane towards the right (FIG. 15B) the goal state markings GM remain and additional error markings EM become larger to the right. The goal markings GM also disappear to the left. The vehicle is moving out of the lane to the left in FIG. 15C. A sound with increasing in intensity, also accompanies the markings when the vehicle is leaving its lane. In this embodiment the lane markings L are not projected onto the windshield. Alternatively these same markings can be presented on a head mounted display device.

Figure 16:
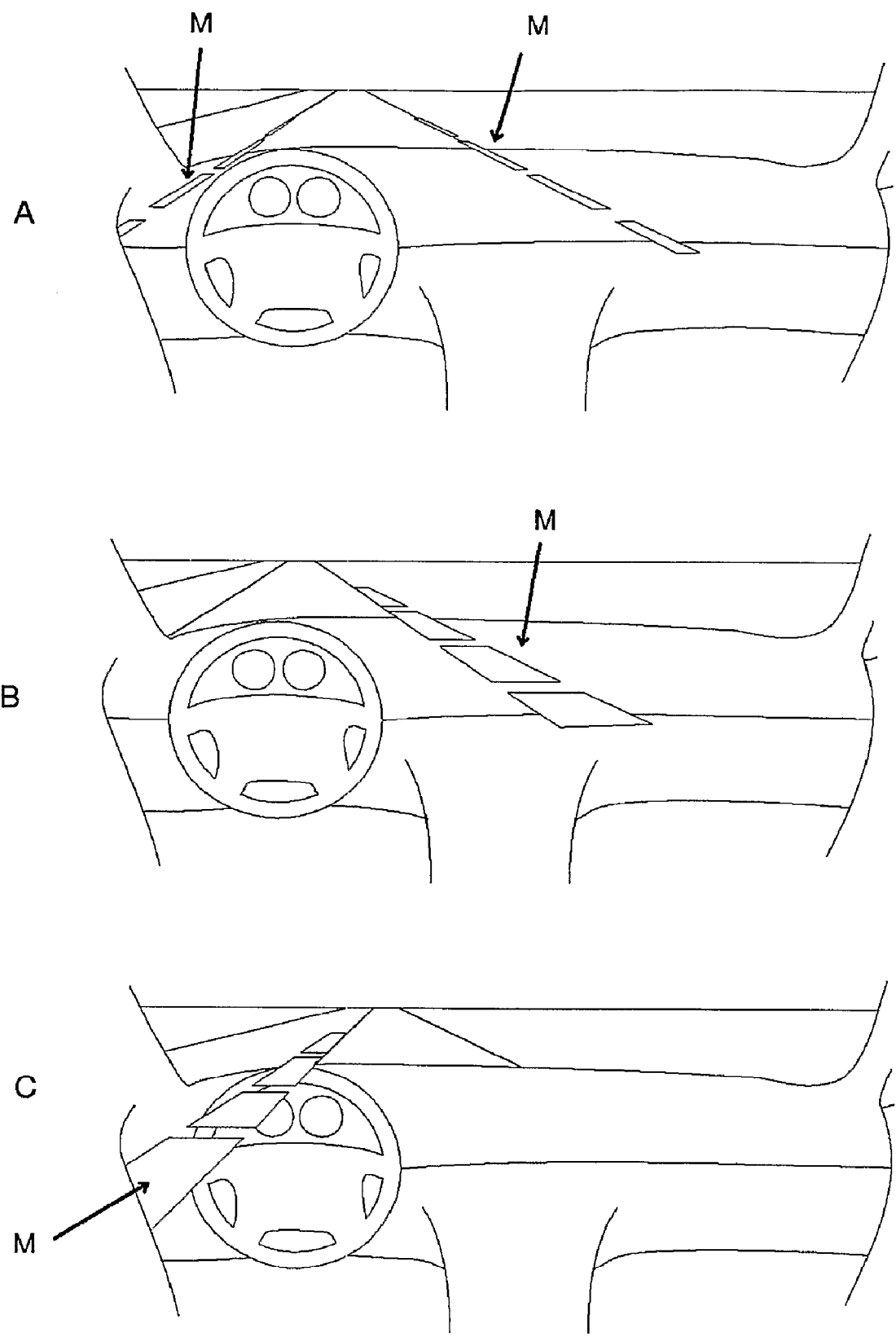
FIG. 16 a fifth embodiment of a display for controlling the present path of a vehicle.

FIG. 16 shows a fifth embodiment of a display for imaging of lane-keeping information with moving markings. FIG. 16A shows markings M that are presented when the vehicle is centered in lane. The markings M are dashed and are presented with the dashes moving toward the driver in FIGS. 16A, B and C. This movement may increase peripheral vision sensitivity and comprehension of meaning. As the vehicle starts moving out of lane towards the right (FIG. 16B) the markings M become larger to the right and disappear to the left. The vehicle is moving out of the lane to the left in FIG. 16C. It is noted that the presentation is extended somewhat onto the windshield as well as on the interior surfaces. Alternatively these same markings M can be presented on a head mounted display device.

Figure 17:
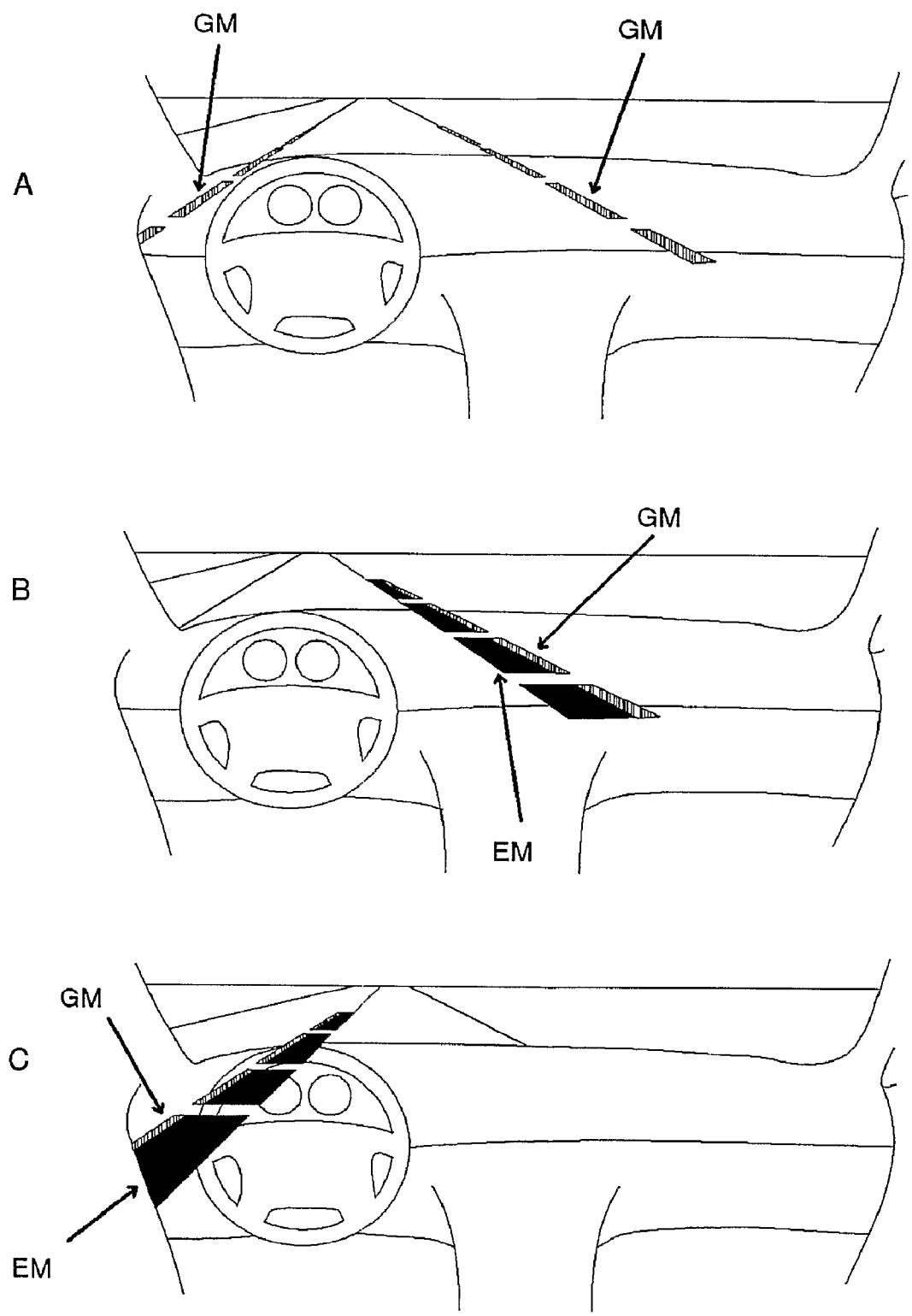
FIG. 17 a sixth embodiment of a display for controlling the present paths of a vehicle.

FIG. 17 shows a sixth embodiment of a display for imaging of lane-keeping information with moving markings and a goal state. FIG. 17A shows the goal-state markings GM that are presented when the vehicle is centered in lane. The markings are dashed and are presented with the dashes moving toward the driver in FIGS. 17A, B and C. This movement may increase peripheral vision sensitivity and comprehension of meaning. As the vehicle starts moving out of lane towards the right (FIG. 17B) the goal state markings GM remain and additional error markings EM become larger to the right. The goal markings GM also disappear to the left. The vehicle is moving out of the lane to the left in FIG. 17C. It is noted that presentation is extended somewhat onto the windshield as well as on the interior surfaces. Alternatively these same markings can be presented on a head mounted display device.

FIG. 18 shows an example of an eyeglass mounted display. FIG. 18A shows what is presented on the glasses, and indicating the gaze point G. FIG. 18B shows the driver's view through the glasses with the markings M; GM overlaid on the view.

FIG. 19A shows a synthetic flow of optical signals in a straight environment. The natural optic flow is continued into the vehicle by projecting optical moving dots that move substantially at the same speed, curvature, and expansion as the natural flow.

FIG. 19B shows a synthetic flow of optical signals in a curved environment. The natural optic flow is continued into the vehicle by projecting optical moving dots that move substantially at the same speed, curvature, and expansion as the natural flow.

This second arrangement which has been described with reference to FIGS. 10 to 18 and in a further developed embodiment with respect to FIG. 19 is provided for supporting present path control as follows:

Generally, control of the present-path position is achieved mainly by peripheral vision. Peripheral vision is the part of the visual field that is greater than about 10 degrees visual angle from the gaze point (fovea). Peripheral vision is especially sensitive to movement, spatial orientation, lighting changes, and is sensitive in low lighting. In driving, drivers rarely gaze directly at the sides of their own vehicle or at lane markings near the vehicle. Rather, information regarding the vehicle's position in lane is extracted with peripheral vision. In controlling the present-path position, the driver compares present position in path with desired present position in path and steers the vehicle to correct this error. The driver most often compares present position relative to lane markings, but can also regulate position relative to objects close to the vehicle.

Access to the information specifying present-path position is not always entirely accessible to our visual system. For example, when drivers operate information systems, such as a radio, peripheral information is blocked by the interior of the vehicle. If present-path error can be made more easily recognizable, then steering corrections become improved and unintentional lane exits can potentially be eliminated.

Lane departures and run-off-road incidents represent a large portion of accidents. Lane-keeping difficulties often are the consequence of distraction caused by use of in-vehicle devices (e.g. a radio).

The display of lane-keeping information as shown in FIGS. 10 to 19, assists the driver in perceiving the effects of lane deviation. The display of lane-keeping information is simple enough to enable the driver to recognize information with peripheral vision only, when gaze is not directed at- or close to the display, without having to move the eyes off the road. Information is presented in such a way that eye movements towards the display of information and subsequent eye-fixations upon the information are not necessary. The information has to be presented as simply and large enough to enable information extraction with peripheral vision.

The display of lane-keeping information uses a combination of a lane tracker 51, a head/eye position sensor 50, and a means to present information 54, as shown in FIG. 10 and FIGS. 1 to 3. Lane-trackers are commercially available products (see U.S. Pat. No. 6,665,603 or U.S. Pat. No. 6,792,345). Devices which provide information on head position and/or eye position (for example U.S. Pat. No. 5,802,479, U.S. Pat. No. 5,844,486, or Seeing Machines FaceLAB at www.seeingmachines.com) are known systems. Information about inclines could be added by extracting this information from navigation systems using Global Positioning Systems and digital maps containing incline information.

An example of a display device for presenting information is again a laser projection display (see FIG. 1). Other examples of devices for presenting information are conventional computer displays, e.g. Liquid Crystal Displays (LCD) or similar, Head Up Displays, light emitting diods (LEDs), helmet-mounted-displays, visor-mounted-displays, and eyeglass-mounted displays.

The information can be designed to work in a number of ways to support lane-keeping as e.g. indicated in FIGS. 11 to 18. FIGS. 11, 12, and 13 show how deviation in lane is represented by an increase in the number of LEDs being displayed. The amount and placement of LEDs being displayed corresponds to the amount of lane deviation registered by the lane-tracking device. The goal-state markings, represented by either white or green colors, (grey in FIGS. 11 to 13) are calculated from knowledge of head position and/or eye position, knowledge of the position of the vehicle in lane, and the width of the vehicle.

The knowledge of head and/or eye position, and knowledge of the geometries of the surfaces which the information is presented on, allows the system to position the goal-state markings to match a continuation of the lane or road markings as indicated in FIGS. 11 to 18. If no head and/or eye position data are known, this lane-matching would not be possible because of variations in seating position, height, and head movements. Lane-keeping information can be presented on both sides as in FIG. 11, or just on the one side at which there is a danger of leaving the lane as in FIGS. 12 to 18.

Goal state markings are presented in the embodiments shown in FIGS. 11 to 13, 15, 17, and 18. However, they could be left out of the presentation leaving only the error to be presented. Alternatively, the system can turn on lane-keeping error presentation only when the vehicle is about to leave the lane, or only when the driver is looking inside the vehicle, or only when the driver is performing a secondary task, or only when in different driving situations (for example only on motorway). The driver should be able to turn the system off and on as he/she pleases.

In general, the display of lane-keeping information can increase the values of a number of perceptual characteristics, such as lighting intensity, lighting density, pattern type, sound, vibrations, and movement. For example, both the number of LEDs shown in the embodiments of FIGS. 12 and 13 or size of the markings as shown in the embodiments of FIGS. 14 to 18, their intensity and/or color and/or sound can increase as the deviation from goal state is increased. The presentation of visual information can be used together with sound as shown in the embodiment of FIG. 15. The embodiments of FIGS. 14 to 17 show different versions of providing information. The embodiments of FIGS. 16 to 18 show moving indicators added to the markings.

Another alternative to support the detection of current path position is to add synthetic optic flow to the interior of the vehicle. The natural optic flow, created by motion through an environment, is continued into the vehicle by projecting optical moving dots that move at substantially the same speed, curvature, and expansion as the natural flow. For example, a laser projector can also be used to present to the driver a continuation of flow of optical dots inside the vehicle (see FIG. 19).

The synthetic optic-flow projected onto the interior acts as extra spatial orientation information and enhances sensitivity to current path position error (Ep in FIG. 5B), or lateral displacement. This increased access to optic flow information inside the vehicle is especially useful when the drivers eyes are diverted from the road. For example, when the driver looks at the gear shift, very little of the outside environment is available on the driver's retina. By having this extra, synthetic spatial orientation information, the driver can easily detect lateral displacements in the optic flow. Thus, drivers are able to maintain a more stable course, not weaving in lane as is normally the case when eyes are removed from the road to perform in-vehicle tasks.

One example of how this can be achieved is to use the laser projector described in connection with FIG. 1. A random selection of dots moves toward the driver D in a manner that mimics a continuation outside optic array. The current optic flow can be estimated from vehicle information such as that used for path prediction (as described above) or it can be estimated by image processing software using video images from a forward looking camera. The presentation of synthetic optic-flow could also be used in combination with the displayed information shown in the embodiments of FIGS. 7 to 18.

In another embodiment, the laser projector (or other displays) can also be used to provide stimulus which would induce a corrective lane-keeping action. This is done by exaggerating the synthetic optic-flow to simulate more curvature than what is actually the case. For example, if the curved synthetic flow lines in FIG. 19B are given more curvature, then the driver is given the impression that the vehicle is turning more to the left than it actually is. The impression of turning more creates a compensatory steering reaction whereby the driver turns a little to the right. Exaggeration of synthetic optic flow works equally well in straight environments. A system with exaggerated synthetic flow induces changes to the driver steering patterns wherein the driver compensates for lane deviations without being aware of it. Thus the unattentive or distracted driver is able to achieve a better lane-keeping performance. The components are the same as those outlined in FIG. 10. The exaggeration of synthetic flow can be incrementally increased as the vehicle moves out of lane.

For off-road applications the invention can be used as well if the goal state is determined e.g. by a navigation system like GPS. In this case the lanetracker-component 51 shown in FIG. 10 is replaced by a pre-programmed evaluation unit for evaluating a deviation from the path which is determined by the navigation system.

In sum, control of the vehicles path is a combination of steering corrections derived from information coming from the driver's assessment of future path error and present path error. This invention provides information to the driver to improve both of these tasks in combination, or separately, which can preferably be chosen by the driver.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. Method for supporting a future path control of a vehicle, comprising:
   estimating an actual future path of the vehicle on the basis of vehicle movement data, the estimated actual future path being a path that the vehicle will follow based on the present vehicle movement data, and
   determining at least one of a head and eye position of the driver and presenting the estimated actual future path to the driver in a direct optical relation to an actual driving environment in the form of markings which provide information about a direction of deviation of the estimated actual future path from the actual driving environment.

2. Method according to claim 1, wherein the estimating step comprises an estimation of a future deviation of the actual future path from a desired future path and at least one of optically, acoustically, and tactilely indicating the estimated future deviation of the path to the driver.

3. Method according to claim 2, wherein the desired future path is given by the actual driving environment.

4. Method according to claim 3, wherein the distance of the presented markings from the actual driving environment increases as the amount of deviation of the estimated actual future path from the actual driving environment increases.

5. Method according to claim 1, wherein the presentation is provided in the form of an optical overlay of an image of the estimated actual future path over the actual driving environment.

6. Method according to claim 1, wherein the presentation is provided in the form of an optical continuation of the actual driving environment.

7. Method according to claim 6, wherein the optical continuation comprises an optical indication of at least one borderline in the actual driving environment to the driver.

8. Method according to claim 7, wherein at least one of the optical continuation and the optical indication is presented by at least one of activating and deactivating of an arrangement of a plurality of LED elements.

9. Method according to claim 7, wherein the optical continuation of the actual driving environment is provided in the form of a two or three-dimensional flow of optical signals, signs and/or patterns surrounding the driver.

10. Method according to claim 6, wherein the optical continuation is presented by at least one of activating and deactivating of an arrangement of a plurality of LED elements.

11. Method according to claim 1, wherein the path control is provided using an aiming device in which an aim is provided by an image of a desired future path, and the indication of the estimated actual future path is presented for supporting the driver's steering of the vehicle.

12. Computer readable medium comprising computer program code adapted to perform a method according to claim 1 when the program is run on a programmable microcomputer.

13. Computer readable medium according to claim 12 wherein the program code is adapted to be downloaded, when run on a computer which is connected to the internet, to a system for supporting a future path control of a vehicle, the system comprising:
   an arrangement for estimating an actual future path of the vehicle based on vehicle movement data, the estimated actual future path being a path that the vehicle will follow based on the present vehicle movement data,
   a device for determining at least one of a head and eye position of a driver, a display device, and a control device for controlling the display device so that the estimated actual future path can be presented in a direct optical relation to an actual driving environment in the form of markings which provide information about a direction of deviation of the estimated actual future path from the actual driving environment.

14. Method according to claim 1, wherein in step (a) the estimated actual future path is indicated acoustically and/or tactilely to the driver.

15. Method according to claim 1, wherein the markings provide an information about the amount of the deviation of the estimated actual future path from the actual driving environment.

16. Method for supporting a future path control of a vehicle, comprising:

estimating an actual future path of the vehicle on the basis of vehicle movement data, and determining at least one of a head and eye position of the driver and presenting the estimated actual future path to the driver in a direct optical relation to an actual driving environment in the form of markings which provide information about a direction of deviation of the estimated actual future path from the actual driving environment, wherein the presentation is provided in the form of an optical continuation of the actual driving environment, the optical continuation comprises an optical indication of at least one borderline in the actua driving environment to the driver, and at least one of the optical continuation and the optical indication is three dimensionally presented by a laser device.

17. Method for supporting a future path control of a vehicle, comprising:

estimating an actual future path of the vehicle on the basis of vehicle movement data, and determining at least one of a head and eye position of the driver and presenting the estimated actual future path to the driver in a direct optical relation to an actual driving environment in the form of markings which provide information about a direction of deviation of the estimated actual future path from the actual driving environment, wherein the presentation is provided in the form of an optical continuation of the actual driving environment, the optical continuation comprises an optical indication of at least one borderline in the actua driving environment to the driver, and the optical indication of the at least one borderline is optically enhanced or attenuated with respect to its intensity and/or thickness and/or contrast and/or colour in correspondence with a decreasing or increasing distance between vehicle and the borderline.

18. Method for supporting a future path control of a vehicle, comprising:

estimating an actual future path of the vehicle on the basis of vehicle movement data, and determining at least one of a head and eye position of the driver and presenting the estimated actual future path to the driver in a direct optical relation to an actual driving environment in the form of markings which provide information about a direction of deviation of the estimated actual future path from the actual driving environment, wherein the presentation is provided in the form of an optical continuation of the actual driving environment, and the optical continuation is three dimensionally presented by a laser device.

19. System for supporting a future path control of a vehicle, comprising:

an arrangement for estimating an actual future path of the vehicle based on vehicle movement data, the estimated actual future path being a path that the vehicle will follow based on the present vehicle movement data, a device for determining at least one of a head and eye position of a driver a display device, and a control device for controlling the display device so that the estimated actual future path can be presented in a direct optical relation to an actual driving environment in the form of markings which provide information about a direction of deviation of the estimated actual future path from the actual driving environment.

20. System according to claim 19, wherein the arrangement comprises a first device for estimating a future deviation of the actual future path from a desired future path and for at least one of optically, acoustically, and tactilely indicating the estimated future deviation of the path to a driver.

21. System according to claim 19, wherein the display device is provided in the form of a laser projector for generating two or three-dimensional images in the interior of the vehicle.

22. System according to claim 21, wherein the control device is provided for presenting the markings with a distance from the actual driving environment which increases as the amount of deviation of the estimated actual future path from the actual driving environment increases.

23. System according to claim 19, wherein the display device is provided in the form of a plurality of LED elements.

24. System according to claim 19, wherein the system is adapted to conduct a method comprising:

estimating an actual future path of the vehicle on the basis of vehicle movement data the estimated actual future path being a path that the vehicle will follow based on the present vehicle movement data, and determining at least one of a head and eye position of the driver and presenting the estimated actual future path to the driver in a direct optical relation to an actual driving environment in the form of marking which provide information about a direction of deviation of the estimated actual future path from the actual driving environment.

25. System according to claim 19, wherein the arrangement is provided for at least one of acoustically and tactilely indicating the estimated actual future path to the driver.

26. System according to claim 19, wherein the markings provide an information about the amount of the deviation of the estimated actual future path from the actual driving environment.

27. Method for supporting a present path control of a vehicle, comprising:

detecting an actual present path of the vehicle, the actual present path being a path that the vehicle is following based on the present vehicle movement data, estimating a present deviation of the detected actual present path from a desired present path, and determining at least one of a head and eye position of the driver and presenting the estimated present deviation to the driver in a direct optical relation to an actual driving environment in the form of markings which provide information about a direction of estimated present deviation.

28. Method according to claim 27, wherein the desired present path is given by the actual driving environment.

29. Method according to claim 27, wherein the presentation is provided in the form of an optical overlay of an image of the estimated present deviation over the actual driving environment.

30. Method according to claim 29, wherein at least one of the number, the size, the intensity and the color of the markings increases as the amount of the estimated present deviation increases.

31. Method according to claim 27, wherein the presentation is provided in the form of an optical continuation of the actual driving environment.

32. Method according to claim 22, wherein the optical continuation comprises an optical indication of at least one borderline in the actual driving environment to the driver.

33. Method according to claim 32, wherein at least one of the optical continuation and the optical indication is presented by at least one of activating and deactivating of an arrangement of a plurality of LED elements.

34. Method according to claim 32, wherein the optical continuation of the actual driving environment is provided in the form of a two or three-dimensional flow of optical signals, signs and/or patterns surrounding the driver.

35. Method according to claim 31, wherein the optical continuation is presented by at least one of activating and deactivating of an arrangement of a plurality of LED elements.

36. Method according to claim 27, wherein the path control is provided in the form of an aiming device in which an aim is provided by an image of the desired present path, and the indication of the estimated present deviation is presented for supporting the driver's steering of the vehicle.

37. Method according to claim 27, comprising estimating an actual future path of the vehicle on the basis of vehicle movement data and at least one of optically, acoustically, and tactilely indicating the estimated actual future path to the driver, and determining at least one of a head and eye position of the driver and presenting the estimated actual future path to the driver in an optical relation to an actual driving environment.

38. Computer readable medium comprising computer program code adapted to perform a method according to claim 27 when the program is run on a programmable microcomputer.

39. Computer readable medium comprising a computer program according to claim 38 adapted to be downloaded, when run on a computer which is connected to the internet, to a system for supporting a present oath control of a vehicle, the system comprising:
an arrangement for detecting an actual future path of the vehicle, the actual future path being a path that the vehicle will follow based on the present vehicle movement data, and estimating a present deviation of the detected actual present path from a desired present path.
a device for determining at least one of a head and eve position of a driver,
a display device, and
a control device for controlling the display device so that the estimated present deviation can be presented in a direct optical relation to an actual driving environment in the form of markings which provide information about a direction of estimated present deviation.

40. Method according to claim 27, wherein in step (a) the estimated present deviation is indicated acoustically and/or tactilely to the driver.

41. Method according to claim 27, wherein the markings provide an information about the amount of the estimated present deviation.

42. Method for supporting a present path control of a vehicle, comprising:
detecting an actual present path of the vehicle,
estimating a present deviation of the detected actual present path from a desired present path, and
determining at least one of a head and eye position of the driver and presenting the estimated present deviation to the driver in a direct optical relation to an actual driving environment in the form of markings which provide information about a direction of estimated present deviation, wherein the presentation is provided in the form of an optical continuation of the actual driving environment, the optical continuation comprises an optical indication of at least one borderline in the actual driving environment to the driver, and wherein at least one of the optical continuation and the optical indication is three dimensionally presented by a laser device.

43. Method for supporting a present path control of a vehicle, comprising:
detecting an actual present path of the vehicle,
estimating a present deviation of the detected actual present path from a desired present path, and
determining at least one of a head and eye position of the driver and presenting the estimated present deviation to the driver in a direct optical relation to an actual driving environment in the form of markings which provide information about a direction of estimated present deviation, wherein the presentation is provided in the form of an optical continuation of the actual driving environment, the optical continuation comprises an optical indication of at least one borderline in the actual driving environment to the driver, and the optical indication of the at least one borderline is optically enhanced or attenuated with respect to its intensity and/or thickness and/or contrast and/or colour in-correspondence with a decreasing or increasing distance between vehicle and the borderline.

44. Method for supporting a present path control of a vehicle, comprising:
detecting an actual present path of the vehicle,
estimating a present deviation of the detected actual present path from a desired present path, and
determining at least one of a head and eye position of the driver and presenting the estimated present deviation to the driver in a direct optical relation to an actual driving environment in the form of markings which provide information about a direction of estimated present deviation, wherein the presentation is provided in the form of an optical continuation of the actual driving environment, and the optical continuation is three dimensionally presented by a laser device.

45. System for supporting a present path control of a vehicle, comprising:
an arrangement for detecting an actual future path of the vehicle, the actual future path being a path that the vehicle will follow based on the present vehicle movement data, and estimating a present deviation of the detected actual present path from a desired present path,
a device for determining at least one of a head and eye position of a driver,
a display device, and
a control device for controlling the display device so that the estimated present deviation can be presented in a direct optical relation to an actual driving environment in the form of markings which provide information about a direction of estimated present deviation.

46. System according to claim 45, wherein the display device is provided in the form of a laser projector for generating two or three-dimensional images in the interior of the vehicle.

47. System according to claim 45, wherein the display device is provided in the form of a plurality of LED elements.

48. System according to claim 47, wherein the control device is provided for increasing at least one of the number, the size, the intensity and the color of the markings as the amount of the estimated present deviation increases.

49. System according to claim 45, wherein the system is adapted to conduct a method comprising:
   detecting an actual present path of the vehicle, the actual present path being a path that the vehicle is following based on the present vehicle movement data,
   estimating a present deviation of the detected actual present path from a desired present path, and
   determining at least one of a head and eye position of the driver and presenting the estimated present deviation to the driver in a direct optical relation to an actual driving environment in the form of markings which provide information about a direction of estimated present deviation.

50. System according to claim 45, wherein the arrangement is provided for at least one of acoustically and tactilely indicating the estimated present deviation to the driver.

51. System according to claim 45, wherein the markings provide an information about the amount of the estimated present deviation.

52. Computer program product comprising computer program code adapted to perform a method for supporting a future path control of a vehicle, the method comprising:
   estimating an actual future path of the vehicle on the basis of vehicle movement data, the estimated actual future path being a path that the vehicle will follow based on the present vehicle movement data, and
   determining at least one of a head and eve position of the driver and presenting the estimated actual future path to the driver in a direct optical relation to an actual driving environment in the form of markings which provide information about a direction of deviation of the estimated actual future oath from the actual driving environment.

53. Computer program product comprising computer program code adapted to perform a method for supporting a present path control of a vehicle, the method comprising:
   detecting an actual present path of the vehicle, the actual present path being a path that the vehicle is following based on the present vehicle movement data,
   estimating a present deviation of the detected actual present path from a desired present path, and
   determining at least one of a head and eye position of the driver and presenting the estimated present deviation to the driver in a direct optical relation to an actual driving environment in the form of markings which provide information about a direction of estimated present deviation.

* * * * *